United States Patent [19]

Rasor

[11] 4,187,672

[45] Feb. 12, 1980

[54] APPARATUS FOR CONVERTING CARBONACEOUS MATERIAL INTO FUEL GASES AND THE RECOVERY OF ENERGY THEREFROM

[75] Inventor: Ned S. Rasor, Sunnyvale, Calif.

[73] Assignee: Rasor Associates, Inc., Sunnyvale, Calif.

[21] Appl. No.: 852,525

[22] Filed: Nov. 17, 1977

[51] Int. Cl.² .......................... F02B 43/08; C10J 3/20
[52] U.S. Cl. ...................... 60/39.12; 48/61; 48/63; 48/76; 48/85.2; 48/92; 48/111; 196/118; 202/219; 266/162
[58] Field of Search ................. 48/61, 62 R, 63, 73, 48/76, 77, 85.2, 89, 99, 101, 92, 111, DIG. 2, 202; 266/161, 162, 144, 197; 60/39.04, 39.12, 39.17; 202/219; 201/11; 196/118

[56] References Cited

U.S. PATENT DOCUMENTS

| 701,186 | 5/1902 | Faulkner | 48/92 |
|---|---|---|---|
| 1,925,490 | 9/1933 | Lichtenberger | 48/92 |
| 2,593,257 | 4/1952 | Bradley et al. | 48/202 |
| 2,647,045 | 7/1953 | Rummel | 48/206 |
| 3,040,519 | 6/1962 | Rae | 60/39.17 |
| 3,084,039 | 4/1963 | Baum | 75/59 |
| 3,340,044 | 9/1967 | MacAfee et al. | 266/161 |
| 3,434,933 | 3/1969 | Mansfield | 201/32 |
| 3,533,739 | 10/1970 | Pelczarski et al. | 48/92 |
| 3,704,586 | 12/1972 | Bruns | 60/39.12 |
| 3,985,520 | 10/1976 | Gold | 48/101 |

FOREIGN PATENT DOCUMENTS

| 2443740 | 3/1975 | Fed. Rep. of Germany | 48/206 |
|---|---|---|---|
| 2521080 | 11/1975 | Fed. Rep. of Germany | 48/92 |
| 465548 | 5/1937 | United Kingdom | 48/92 |

*Primary Examiner*—S. Leon Bashore
*Assistant Examiner*—Peter F. Kratz
*Attorney, Agent, or Firm*—Phillips, Moore, Weissenberger, Lempio & Majestic

[57] ABSTRACT

The invention is concerned with novel apparatus and process for converting crude carbon such as coal, carbonaceous wastes and the like into valuable chemical products and/or energy. A mass of solid crude carbonaceous fuel is fed into a high temperature liquid which acts as a solvent for carbon at a temperature sufficient to carbonize the mass and by which the carbon is separated from impurities. Volatile fractions are removed from the mass which acts as a distillation column. Air, or another oxygen source, is introduced into the reactor wherein it reacts with the carbon dissolved in the liquid therein, which may preferably be iron to form a hot fuel gas. The hot fuel gas is then used to produce useful energy, generally via a stepwise procedure.

29 Claims, 8 Drawing Figures

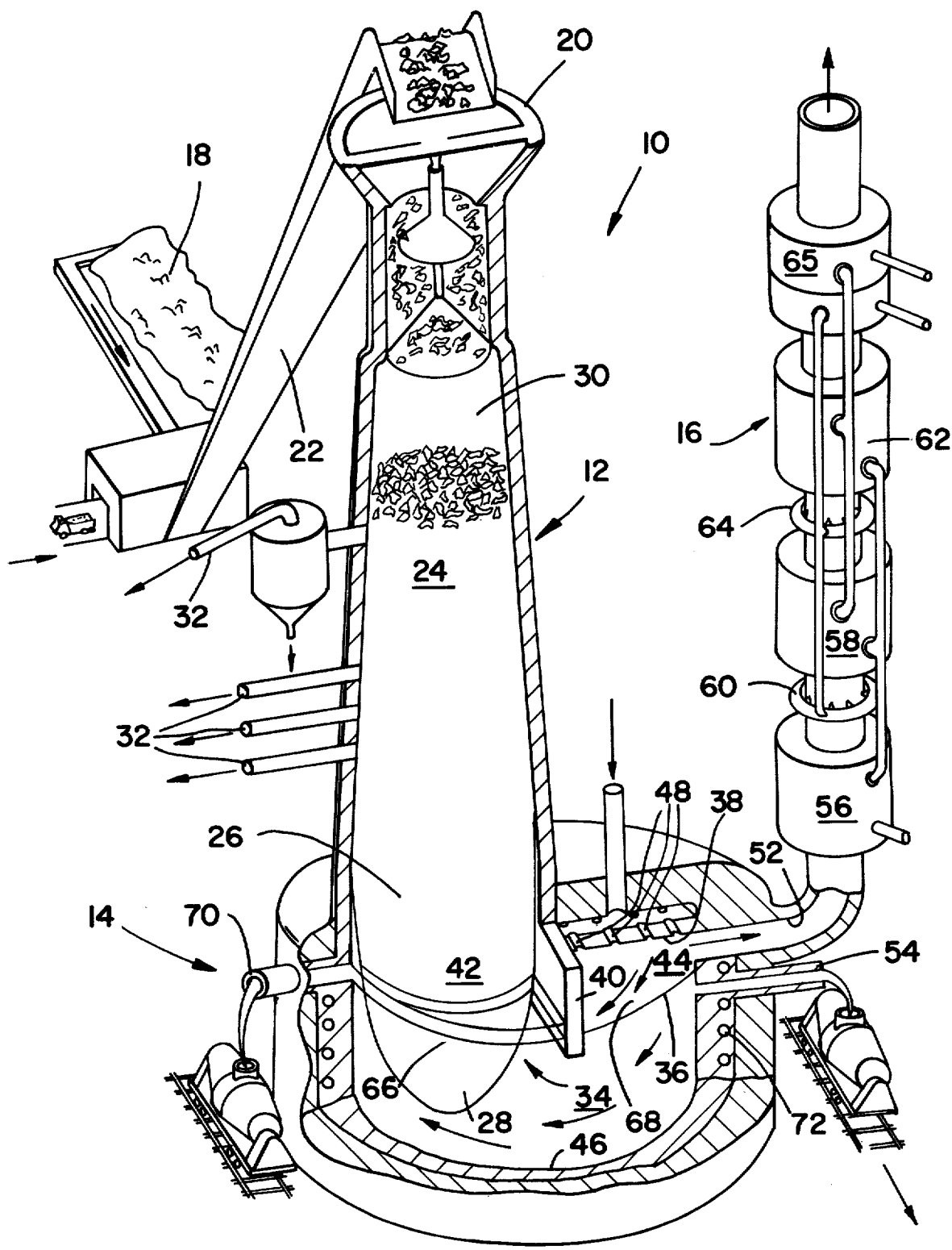
FIG_1

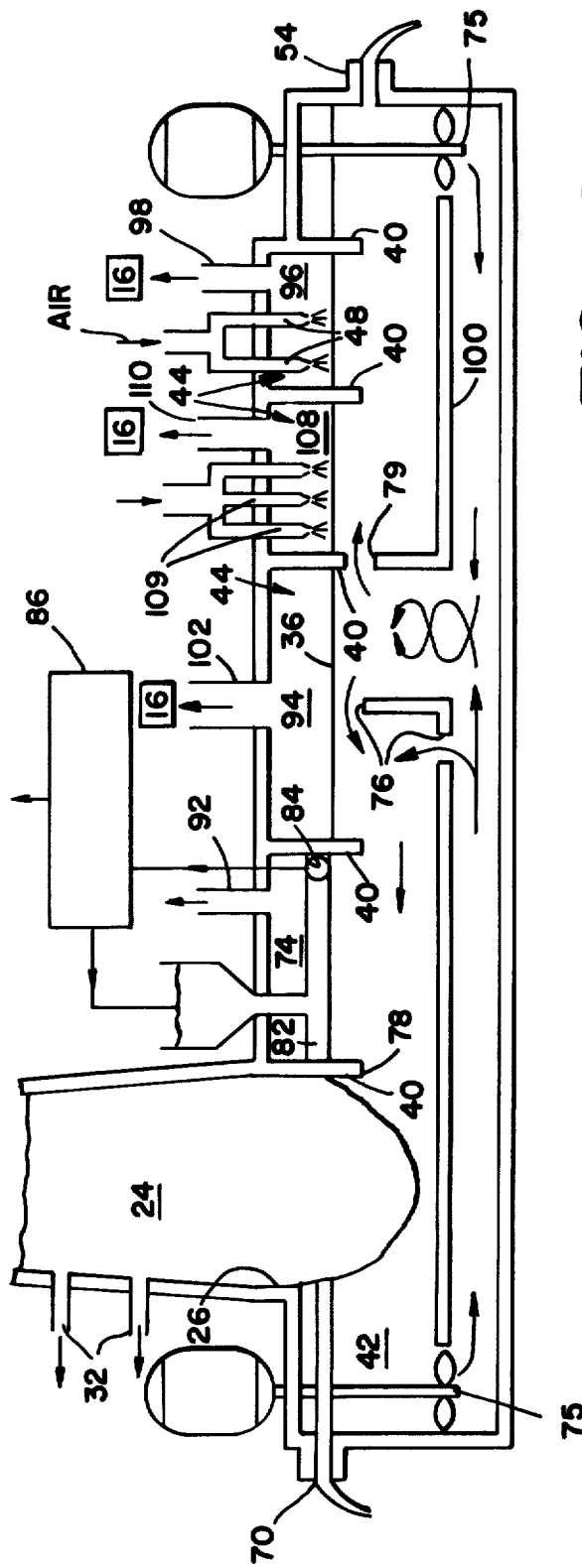
FIG_2
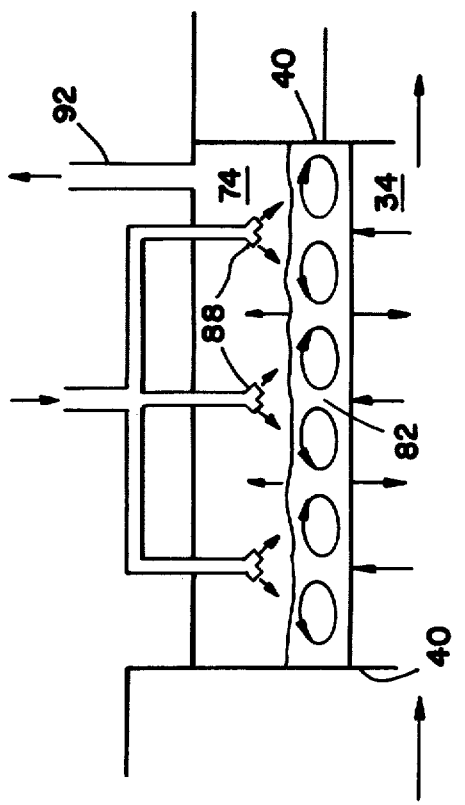
FIG_3

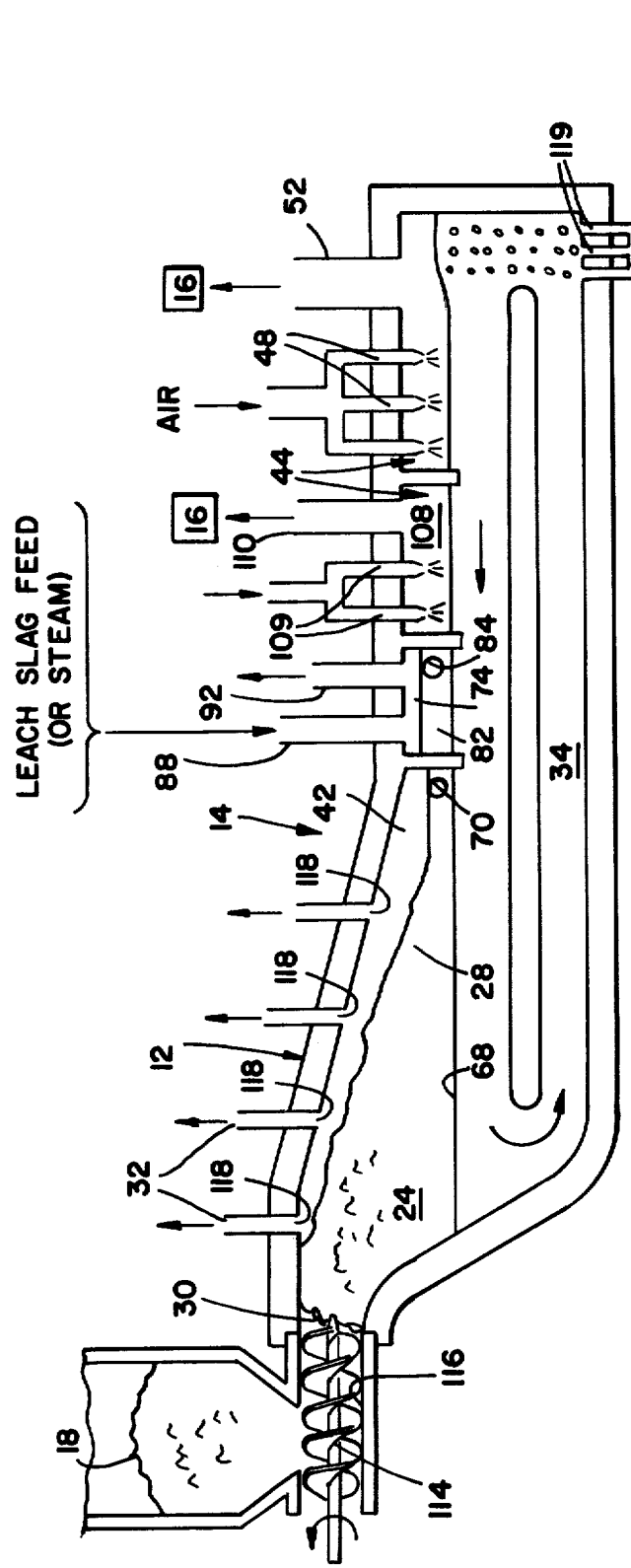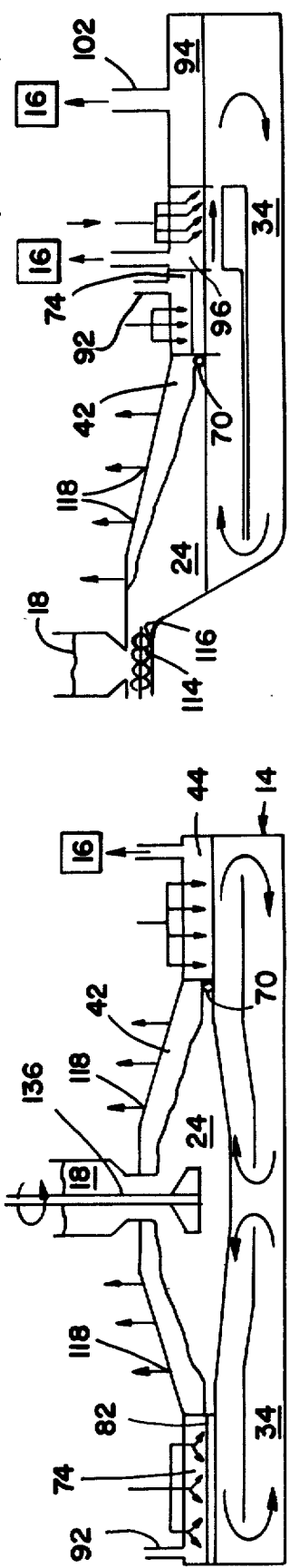

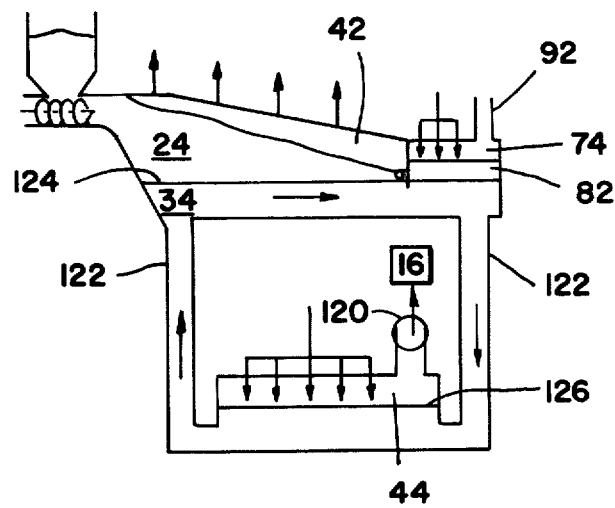
FIG_5
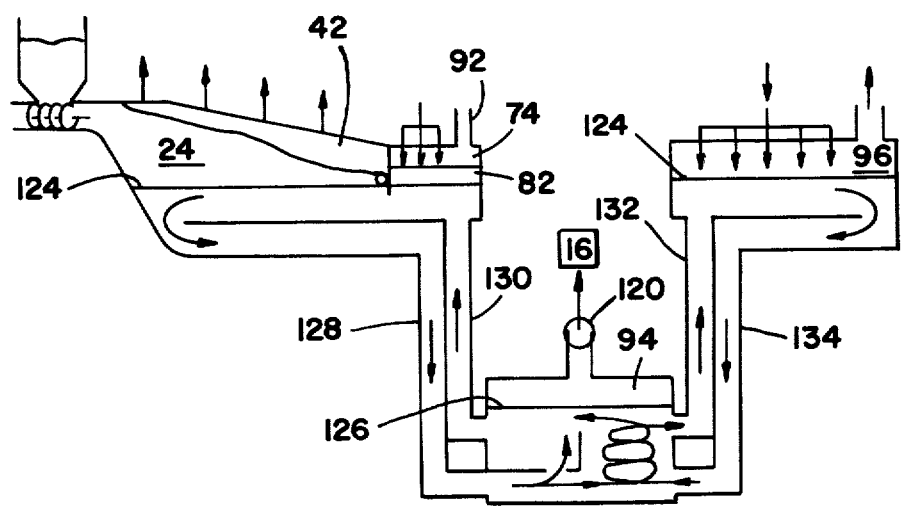
FIG_6

APPARATUS FOR CONVERTING CARBONACEOUS MATERIAL INTO FUEL GASES AND THE RECOVERY OF ENERGY THEREFROM

BACKGROUND OF THE INVENTION

1. Field of the Invention

The invention is concerned with the conversion of a feed which yields carbon on being heated above a carbonization temperature thereof and which is solid at ambient temperature, e.g., 20° C., into a hot gas. The hot gas finds use in energy generation and chemical processing or the like. Valuable volatile chemicals and impurities may be separated from the feed while it is being heated and fed into the reactor wherein the carbonization and gasification occur.

2. Prior Art

The combustion and gasification of coal and other impure carbon containing fuels by carbonization and solution of the carbon in molten iron and its oxidation therein is known as a general process. The state of the prior art in this regard is set out, for example, by J. A. Karnavas, et al, in "ATGAS—Molten Iron Coal Gasification", 1972 AGA Synthetic Pipeline Gas Symposium, Chicago, Ill., Oct. 30, 1972, as well as in Pelczarski, et al, U.S. Pat. Nos. 3,526,478 and 3,533,739.

U.S. Pat. No. 1,838,622 discloses the method and apparatus of a vertical distillation-pyrolysis chamber linked to a combustion chamber. Some solids from the vertical chamber enter the combustion chamber and the gaseous products of combustion (non-combustible) directly heat the vertical distillation-pyrolysis chamber. The vertical chamber apparatus treats carbonaceous material, acts as a fractionator, and allows reflux of distillation products. The material proceeds by gravity flow through the column, the chamber fractionates volatile components, refluxing is provided to control the heat distribution within the column, heated gas may be introduced to heat material within the column, the process is continuous, and the column may be characterized as differential.

U.S. Pat. No. 1,759,821 discloses destructive distillation of carbonizable material in a retort in which material moves downward continuously and volatile components are fractionated.

U.S. Pat. No. 1,669,023 discloses carbonization and distillation of coal in a vertical chamber. Heat is supplied by upwardly flowing gas and gas may be added to points along the chamber to regulate the temperature distribution.

U.S. Pat. No. 3,109,781 discloses semi-continuous gravity flow of hydrocarboniferous material through a retort heated by injection of hot noncombustion-supporting gases at the lower end. Volatile components exit at the top end of the retort and enter a fractionator.

U.S. Pat. No. 3,838,015 discloses pyrolytic decomposition of trash in which air is admitted at a controlled rate to maintain combustion of gases produced and therefore regulate the pyrolysis temperature.

U.S. Pat. No. 3,886,048 discloses carbonizing and desulfurizing carbonaceous material by heating carbonaceous material admixed with iron in a reducing atmosphere and then subjecting the resulting char to an oxidizing atmosphere.

U.S. Pat. No. 2,787,584 discloses continuous carbonization of solid carbonaceous material by suspending the material in a moving molten stream at greater than 800° C. An overhead stream of volatized chemicals and coke which is gravity separated from the molten metal are produced.

U.S. Pat. No. 3,890,908 discloses pyrolytic reduction of carbonaceous waste material by floating it up through a molten metal bath.

U.S. Pat. No. 1,734,970 discloses flow of carbonaceous material through a molten iron bath to produce volatile and nonvolatile products.

U.S. Pat. No. 2,953,445 discloses a two-chamber molten slag bath reactor for the production of water gas from a carbonaceous raw material. Gasification of the raw material and carburization of the bath occur in one chamber and combustion occurs in the other. Air or steam may be introduced into the bath through the walls of the bath or above the surface level of the bath (in the combustion chamber), the inlet being arranged tangentially so that the medium is set in circular motion between the chambers which are divided by gastight partitions.

Previously mentioned U.S. Pat. No. 3,533,739 discloses combustion of sulfur-bearing carbonaceous fuel by subsurface injection of the fuel and preheated air into a molten bath. Sulfur is extracted by the addition of lime and the main product of combustion is carbon monoxide. Carbon monoxide product may undergo combustion by injection of air. Heat combustion may be transferred to steam which drives power turbines.

U.S. Pat. No. 1,803,221 discloses apparatus and process for the production of hydrogen gas from methane-containing gases in a molten iron bath. The molten iron bath is divided into two parts by a partition wall which separate gaseous zones but leaves the molten iron free to circulate. Feed gas is blown in below the surface on one side of the partition and air is blown in on the other side. (The air may be blown in tangentially so as to cause the iron to circulate).

U.S. Pat. No. 1,592,861 discloses production of water gas by adding carbonaceous material to a molten bath, passing steam through the bath, maintaining bath circulation to promote absorption of incoming carbon into the bath. U.S. Pat. No. 1,592,860 discloses production of carbon monoxide by charging iron ore and coal or other fuel into a tower and allowing the mass to rest on the surface of the molten bath (held up by the buoyant force) followed by absorption of carbon into the bath and metal reduction.

U.S. Pat. No. 3,084,039 discloses blowing a stream of free oxygen-containing gas across the surface of a molten iron bath containing carbon to produce carbon monoxide gas.

U.S. Pat. No. 314,342 discloses manufacture of hydrogen gas by continuous introduction of carbonaceous material, simultaneously with steam, into a chamber containing a metallic oxide, followed by treatment of gaseous products with lime.

U.S. Pat. No. 3,933,128 discloses combustion of carbonaceous fuel dissolved in a molten salt to produce heat which may be used to generate steam to drive power turbines.

U.S. Pat. No. 2,876,527 discloses the cracking and dispersion of heavy hydrocarbon feedstocks in molten alkali metal carbonate baths followed by gasification of the dispersed material by contacting with oxygen, steam, or $CO_2$ at 3000° F. Cracking and combustion occur in separate vessels.

U.S. Pat. No. 3,933,127 discloses a means of sulfur removal from carbonaceous fuel during combustion.

Fuel, a collector, and oxygen are introduced into a molten bath of salt. The collector forms a sulfur compound which is insoluble in molten salt.

U.S. Pat. No. 3,812,620 discloses the cooling of the outer metal shell of a molten metal bath by circulation of fluid through a plurality of passages within the shell. A layer of refractory material lies between the bath and the outer metal shell.

SUMMARY OF THE PROBLEM

Because of the increasing scarcity of relatively pure fossil fuels such as petroleum and natural gas, the use of impure fuels such as coal and waste materials is rapidly becoming more important. There are basically three major considerations which arise in the transition to the use of these impure fuels in electric power plants. First, noncombustible and noxious impurities in the impure fuels must be prevented from being released into the environment after and during combustion. Second, impure fuels generally cannot be used efficiently in high temperature advanced energy conversion cycles because of the fouling and corrosion caused by the high levels of such impurities as fly ash, salt and the like. Third, impure fuels are much more valuable and useful if they can be refined into the chemicals and pure fuels they contain instead of being burned completely in their crude form.

While methods are known by which the impurities can be removed from an impure fuel prior to its introduction into a combustor, and other methods are known whereby impurities can be removed from the flue gas resulting from the combustion of the impure fuel, both of these methods add substantially to the cost of the fuel or of the power plant and generally degrade the overall efficiency of energy production from the fuel. With respect to refining impure fuels into chemicals it is to be noted that crude petroleum is conventionally refined to obtain the valuable petrochemicals and fuels it contains before residue therefrom is burned in power plants. Coal and wastes are, however, generally not refined before burning because the gross impurity content makes such refining economically infeasible.

The present invention is concerned with an integrated process and apparatus in which impure fuel such as coal, waste products, oil shale, bunker fuel residue, asphalts and the like are continuously refined into valuable volatile and gaseous fractions which are separated from noncombustible and noxious impurities such as ash and sulfur, and the residuals are combusted to give high temperature gases suitable for direct use in advanced high-temperature electric power production cycles. An important advantage of the apparatus and process of the present invention is the ability to change the proportions of the output therefrom among electric power and the various other valuable products, depending on the relative demand for these products. In this respect, the subject invention provides a capability similar to that of a crude oil refinery which can change the proportion of automotive fuel, aircraft fuel, heating oils and petrochemicals which it produces from crude oil to efficiently meet seasonal fluctuations and demand with minimal inventory and storage facilities. Another significant advantage of the invention is that the problem of efficiently utilizing the huge amount of char produced in many crude coal refining attempts is inherently avoided since the char is itself consumed and converted into valuable products and/or energy.

SUMMARY OF THE INVENTION

In one sense the invention is concerned with a process of converting a carbon containing fuel which is solid at ambient temperature into a hot gas. The process comprises introducing a feed which yields carbon on being heated above a carbonization temperature thereof and which is solid at ambient temperature, into a carbonization chamber of a reactor and into contact at a temperature above said carbonization temperature with a liquid which is a solvent for carbon and which fills said reactor up to a liquid level therein. There is introduced into oxidation chamber means in said reactor, said oxidation chamber means being separated from said carbonization chamber above said liquid level but being in liquid flow communication therewith below said liquid level, an oxygen source, e.g., oxidizing gas means such as air, other oxygen gas containing mixtures, steam, a metal oxide such as iron oxide, or the like, or mixtures of the preceeding having oxidization ability. The oxygen source reacts in an overall exothermic manner with the liquid to elevate the temperature of the liquid to said temperature above said carbonization temperature. Means are provided for forcing convection of the liquid within the reactor. A hot gas formed within the oxidation chamber means is conducted thereawayfrom, said hot gas being formed by reaction of the oxygen.

In another sense, the invention is concerned with a process for converting a carbon containing feed into a hot gas, comprising introducing a feed which yields carbon on being heated above a carbonization temperature thereof and which is solid at ambient temperature into a reactor having therewithin a liquid solvent for carbon filling said reactor up to a liquid level therein below a top thereof. The feed introducing comprises contacting a first end of the mass of the feed with the liquid, the mass extending linearly into the reactor; progressively adding the feed to a second end of the mass to maintain the extension thereof into the reactor substantially constant and to create a temperature gradient along the mass; and taking off volatile fractions of differing volatilities from take-off means spaced from one another and arranged to be in gas flow communication with different portions of the mass. Also part of the process is introducing into the reactor and into contact with the liquid, an oxygen source for reaction with the carbon to produce a sufficient temperature in the liquid to cause carbonization of the first end of the mass and to provide heat for establishing the temperature gradient.

In other senses yet, the invention comprises particular apparatus for carrying out the processes as described herein.

BRIEF DESCRIPTION OF THE DRAWINGS

The invention will be better understood by reference to the figures of the drawings, wherein like numbers denote like parts throughout and wherein:

FIG. 1 illustrates in a schematic perspective representational view, partially in section, an apparatus and process in accordance with a first embodiment of the present invention;

FIG. 2 illustrates a side schematic section view, a portion of the apparatus and process of the present invention which relates to a second embodiment thereof;

FIG. 3 illustrates in side schematic section view a representation of a portion of a third embodiment of the present invention;

FIG. 4 illustrates in side schematic section view, a portion of a fourth embodiment of the apparatus of the present invention;

FIG. 5 illustrates in side schematic sectional view, a fifth embodiment of the present invention;

FIG. 6 illustrates in side schematic section view a variation of FIG. 5;

FIG. 7 illustrates in side schematic section view one form of circulation inducing means useful with the apparatus of the present invention; and FIG. 8 illustrates in side schematic section view yet another embodiment of the present invention.

DETAILED DESCRIPTION OF THE PREFERRED EMBODIMENTS

First Embodiment

FIG. 1 illustrates an apparatus 10 in accordance with the present invention. The apparatus 10 includes a digestor 12, a reactor 14 and an energy extractor 16.

A feed 18 which yields carbon upon being heated above a carbonization temperature thereof and which is solid at ambient temperature is fed into a top end 20 of the digestor as for example, via a conventional transport belt 22. The feed 18 can comprise any of a number of materials or mixtures thereof. For example the feed can comprise raw coal, undifferentiated industrial and municipal waste, animal and agricultural waste, sewage sludge, tar residues, asphalt residues, oil shale, and the like. The only essential characteristic of the carbon containing fuel is that it be such that upon being heated to a carbonization temperature in a manner which will be described in following, it is converted into carbon, and that at ambient or room temperature, e.g., 20° C., it is solid. The term solid is used broadly herein to include glassy solids such as tar, asphalt and the like. It should also be noted that the feed can include non-carbonaceous materials such as scrap iron, limestone or the like, intermixed therewith and may even advantageously contain one or more of these materials for reasons which become apparent from the description which follows.

The feed 18, after passing into the top end 20 of the digestor 12, then proceeds downwardly therethrough under the influence of gravity feed. While within the digestor 12, the feed is converted into a generally contiguous mass 24 because of heat supplied to a bottom end 26 of the digestor 12 and to a first end 28 of the mass 24. Within the digestor 12, a temperature gradient is created in the mass 24 with a higher temperature at the first end 28 thereof and a lower temperature at a second end 30 thereof. Any volatile components of the feed 18 are progressively volatilized and, basically, the digestor 12, serves as a distillation and partial thermal cracking column for the feed 18. A plurality of takeoff means 32 are provided along the length of the digestor 12 and hence along the length of the mass 24. The highest of the takeoff means 32 receives the most volatile gases emitted by the mass 24 within the digestor 12, for example, hydrogen, methane and water vapor. The lower of the takeoff means 32 progressively receive higher molecular weight volatizable hydrocarbons produced by distillation, thermal decomposition, and/or cracking, and/or reforming of the feed 18 within the mass 24.

Turning now to a consideration of the reactor 14, said reactor 14 includes a liquid 34 therewithin which the first end 28 of the mass 24 contacts. The liquid 34 is a solvent for carbon and fills the reactor 14 up to a liquid level 36 therein, which liquid level 36 is below a top 38 of the reactor 14. The reactor 14 preferably includes baffle means 40 which completely separate the reactor 14 above the liquid level 36 into a carbonization chamber 42 and oxidation chamber means 44. The baffle means 40 are made to terminate below the liquid level 36 and above a bottom 46 of the reactor 14. This allows flow of the liquid 34 between the carbonization chamber 42 and the oxidation chamber means 44. A plurality of conduits 48 serve as means for introducing oxidizing gas means having an oxygen content into the oxidation chamber means 44 and against the liquid level 36, generally aimed to cause flow of the liquid 34 between the carbonization chamber 42 and the oxidation chamber means 44 and thus serves as means for forcing convection of the liquid 34 within the reactor 14. Means are also provided for conducting away a first hot gas from the oxidation chamber means 44. The means for conducting the first hot gas in the embodiment illustrated in FIG. 1 comprises a takeoff pipe 52.

Turning particularly to the oxidizing means, it should be noted that this oxidizing means should be such that it reacts overall in an exothermic manner with the carbon dissolved in liquid 34 to form carbon monoxide gas, thus keeping the temperature of the liquid 34 high enough to remain molten and be above a carbonization temperature of the mass 24 of the feed 18. Any number of oxygen containing gases are suitable as the oxidizing means of the present invention. For example, air is particularly suitable if it is preheated sufficiently by the exhaust gases or other means to maintain the liquid 34 in the liquid state. If the oxidizing gas has a much higher free oxygen content than air, for example more than 50%, the reaction is so strongly exothermic that it may be desirable to mix said gas with steam or to independently add steam, which itself will oxidize the carbon in the liquid 34 to form carbon monoxide gas along with hydrogen gas. Since the reaction of steam with the carbon in the liquid 34 is endothermic, its addition moderates the reaction so that it is not overly exothermic and so that the liquid 34 remains within the said desirable temperature range. It is also contemplated that a metal oxide ore, e.g., iron oxide, can be added to the liquid 34 wherein it will serve as part or all of the oxidizing means and will oxidize the carbon to form carbon monoxide gas and will itself be converted to the metal, e.g., iron, which can be recovered from the reactor 14 within a desirable temperature range, for example, in a range from about 1200° C. to about 1700° C.

The liquid 34 can be any liquid which will serve as a solvent for carbon and which will bind oxygen thereto either by chemical reaction therewith or by significantly dissolving the oxygen therein. For example, the liquid 34 can be a molten carbonate salt or iron or an iron containing alloy. An iron based liquid 34 has been found to be especially desirable and practical for carrying out the various processes of the present invention. It should be noted that when the liquid 34 is iron, makeup scrap iron and the like can be added to the digestor 12 along with the feed 18 to react with and remove impurities such as sulfur from the feed and prevent such impurities from being evolved with the valuable gases during the carbonization process. Feed streams such as coal and trash have a natural iron content. Such a throughput of iron ensures that the composition of the liquid 34 will stay substantially constant. When such an iron throughput exists, a tap 54 will generally be provided as a part of the reactor 14 for the removal of some of the liquid 34 and its eventual reprocessing in metallurgical refineries. In this manner, the composition of the liquid 34 can be kept substantially constant while various metals and the like which may become concentrated therein can be constantly stripped off and recovered via metallurgical processing.

Turning now to the energy extractor 16, it will be apparent that it receives a hot gas via the takeoff pipe 52 and then directly makes use of the energy content of that hot gas to generate power. For example, in a first energy conversion stage 56, the hot gas from the oxidation chamber means 44 can generate electrical power efficiently via gas turbine operation, thermionic energy generation or other advanced topping cycle energy generation. The hot gas is cooled somewhat by the energy removed in the first stage 56, whereupon the somewhat cooled hot gas can pass to a second energy conversion stage 58 after air has been injected thereinto via an air injector 60 to combust a portion of the hot gas and reheat the hot gas to its original temperature or another desired elevated temperature. In the second stage 58, electrical power can be generated more efficiently at the original high temperature than at the somewhat lowered temperature. From the second stage 58, the again somewhat cooled gas can pass on to a third energy conversion stage 62 via an intermediate air injector gas burner 64 which will raise the temperature of the gas again through chemical reaction whereby additional energy may be extracted efficiently in the third stage 62. If desired, the hot gas from the third stage 62 can pass through a heat exchanger 65 wherein the heat thereof is used to super heat steam conducted to an electric power plant or to heat feed water and/or air, with the feed water being used for any desired process and the air being used, for example, as the air injected via the plurality of conduits 48 into the oxidation chamber means 44.

Such staged combustion by air injection allows the hot gas to be maintained quasi-isothermally throughout the system at the highest temperature permitted by the energy conversion cycles, and by the limit imposed by the formation of nitrogen oxide pollutants in the exhaust, thereby allowing maximum efficiency and minimum size and cost of the energy conversion system. Use of air injection into the hot fuel gas, as compared with the conventional injection of fuel into a hot oxidizing gas, permits maintaining a highly reducing atmosphere throughout most of the energy conversion process. This greatly reduces the quantity of nitrogen oxides formed at a given gas temperature and permits the use of superior high temperature materials which cannot be used in an oxidizing atmosphere. It should be recognized that the hot off gas from the takeoff pipe 52 (or its equivalent in other embodiments of the present invention) is used substantially better directly in a staged combustion process. The ratio of the heating value $H_R$ of hot off gas to the heating value, $H_O$ of gas at the same temperature obtained by burning colder off gas is $$\frac{H_R}{H_O} = \left[1 - \frac{CdT}{Q}\right]\left[1 + \frac{5}{6}\frac{CdT}{Q}\right] \text{(approximate)}$$

where C is the specific heat of the gases, Q is their heat of combustion per pound and dT is the difference between off gas temperature of the two different gasifiers. The first bracketed term arises from the additional sensible heat in the hotter off gas. The second bracketed term arises from the additional volume of nitrogen mixed with the colder gas during its combustion with air to the higher temperature. What results then is a staged combustion-energy abstraction apparatus referred to generally as an energy extractor 16, which energy extractor is operated directly by reactor 14 wherein a liquid 34 dissolves carbon introduced from the digestor 12 and reacts that carbon with an oxidizing means introduced into the oxidation chamber means 44 to produce a hot gas, generally a hot fuel gas.

Since the feed 18 introduced into the digestor 12 and eventually introduced in the form of the mass 24 into the reactor 14 will generally contain a number of materials besides carbon, it is clear that an impurity slag layer 66 will be formed upon the surface 68 of the liquid 34 and thereby be separated from the carbon and the valuable volatile chemicals. A slag tap 70 is thus preferably provided which serves as a means for removing the impurity slag layer 66 formed in the carbonization chamber 42. It is further noted that since the impurity slag layer 66 is maintained only within the carbonization chamber 42, as a result of the separation provided by the baffle means 40, there is substantially no impurity slag layer within the oxidation chamber means 44 and hence the oxidizing means, usually oxidation gas means, introduced into the oxidation chamber means 44 can be maintained in efficient close contact with the liquid 34 therein, leading to a high rate of oxygen reaction therewith in the liquid 34, and an absence of fly ash in the hot gas exhaust evolved therefrom. The impurity slag layer 66 as removed by the slag tap 70 can then be used to produce by-products such as bricks, insulation material and the like.

It will be noted that when an oxidizing gas is used with a high free oxygen content, the reactor 14 may include means for skull cooling whereby the liquid 34 is within a vessel made of solidified liquid 34. Thus, a plurality of skull cooling pipes 72 are provided within the walls of the reactor 14. As cooling fluid (e.g., preheat oxidizing gas) is passed through the skull cooling pipes 72, the liquid 34 is cooled to below its melting point thereadjacent, thus forming a solid layer of solidified liquid 34 which serves as a non-corroding vessel for the liquid 34.

It will be noted that in the embodiment illustrated in FIG. 1, the dissolved carbon within the liquid 34 is circulated underneath the baffle means 40 to the oxidation means chamber 44 and therein reacts with the iron oxide dissolved in the liquid 34 in said oxidation chamber means 44 to form carbon monoxide which is quite insoluble in, for example, molten liquid iron. The carbon monoxide thus forms a part of the hot gas which passes up the takeoff pipe 52. Another part of the hot gas which passes up the takeup pipe 52 is formed, for example, from the air which is injected thereinto. The oxygen of the air, as previously mentioned, reacts with the iron to form iron oxide which is thereby bound (chemically or physically) to the liquid 34. This oxygen later becomes carbon monoxide through reaction with the dissolved carbon as just explained. The nitrogen, argon and the like in the air, however, is not reactive under the conditions in the reactor 14 with the iron and is simply heated within the reactor 14 and forms a part of the first hot gas which passes up the takeoff pipe 52.

Similarly, if steam is injected along with air, the oxygen is abstracted therefrom by the iron to form iron oxide with the concurrent production of hydrogen and with the hydrogen then forming a part of the gas which passes up the takeoff pipe 52. Thus, that which is being converted to energy in the energy extractor 16 would comprise a mixture of nitrogen gas, hydrogen gas, and carbon monoxide along with various impurity gases and perhaps some reaction gases of these.

SECOND EMBODIMENT OF THE INVENTION

Referring now particularly to FIG. 2, there is illustrated therein an embodiment of the present invention wherein the baffle means 40 defines in addition to the carbonization chamber 42 and the oxidation chamber means 44, a leaching chamber 74 for sulfur removal. The baffle means 40 serves to separate the leaching chamber 74 above the liquid level 36 from the carbonization chamber 42 and the oxidation chamber means 44, but allows flow of the liquid 34, for example, under the influence of mechanical stirrers 75, into the leaching chamber 74 from the carburization chamber 42 and out of the leaching chamber 74 and into the oxidation chamber means 44. Thus, liquid 34 which has both carbon and sulfur dissolved therein can enter the leaching chamber 74 via entrance means 76 and can leave the leaching chamber 74 via exit means 78 and can enter the oxidation chamber means 44 via oxidation entrance means 79.

A high basicity mixture of metal oxides is maintained in the leaching chamber 74 as a leach slag 82 floating on the surface of the liquid 34. The leach slag 82 may include any of a number of alkali metal and/or alkaline earth oxides but will be spoken of as predominantly a calcium oxide slag for illustration purposes and because calcium oxide is readily available and will work extremely well in the desulfurization reaction, reacts with the dissolved sulfur to form calcium sulfide and a gas comprising carbon monoxide. The purpose of the chemically non-active components of the leach slag 82 is to lower its melting point and thereby allow the leach slag to be maintained in a molten state at the temperature of the liquid 34 to ensure intimate and complete contact between the slag 82 and liquid 34. An example of a suitable slag if the liquid 34 is molten iron at 1500° C. would be the mixture 50% by weight CaO, 7% $Al_2O_3$ and 43% $SiO_2$. The leach slag 82, which includes the calcium sulfide formed within the leaching chamber 74, is substantially insoluable in the liquid 34, which liquid 34 is generally molten iron and forms the separate molten leach slag layer 82 which floats upon the liquid 34 within the leaching chamber 74. A leach slag tap 84 is provided for removal of the leach slag. The leach slag 82 may be conducted from the tap 84 to a conventional desulfurizer 86 wherein its calcium sulfide content is reacted with steam and carbon dioxide to form sulfur which is removed and the regenerated leach slag 82 may be recycled into leaching chamber 74. Such regeneration and recycled is usable with all embodiments of the invention.

As illustrated in FIG. 3 and as is useful with all embodiments of the invention, the leach slag 82 is preferably regenerated continuously within the leaching chamber 74 by directing jets 88 of superheated steam onto its free surface. The steam reacts with the calcium sulfide in the leach slag 82 to form $H_2S$, CO and a metal oxide, generally CaO. The leach slag layer 82 prevents direct contact of the steam with the liquid 34. The impingement of the steam jets upon the molten leach slag layer 82 induces secondary flow (shown as circular arrow) which stirs the layer causing efficient transfer of CaS from the slag-liquid interface to the steam-slag interface and the return of CaO.

A leaching chamber outlet pipe 92 serves for removal of the hydrogen sulfide and carbon monoxide gases formed within the leaching chamber 74. This outlet pipe 92 can then be used as a feed to a converter which converts the $H_2S$ to elemental sulfur for example by the well-known Claus process.

Adverting again primarily to FIG. 2, it is seen that the oxidation chamber means 44 can be divided in the embodiment illustrated in FIG. 2 into a decarbonization chamber 94 and a first oxidation chamber 96. This can be accomplished by extending the baffle means 40 to include means for separating the oxidation means 44 within the reactor 14 above the liquid level 36 from both the carbonization chamber 42 and the first oxidation chamber 96, and, when such is provided, from the leaching chamber 74. With such a structure, the oxidizing gas means, for example, air, is introduced into the first oxidation chamber 96 via one or more of the plurality of conduits 48 wherein it reacts with the molten liquid 34 to provide oxygen bound therein, for example, iron oxide, and to further provide nitrogen as a hot gas which can exit therefrom as via a first oxidation chamber outlet pipe 98. A first oxidation chamber-to-decarbonization chamber passage 100 is provided to allow the circulation of oxygen rich liquid 34 into the decarbonization chamber 94, wherein it reacts with carbon dissolved in the liquid 34 to form carbon monoxide which then exits the decarbonization chamber 94 via a decarbonzation chamber outlet pipe 102. The concentration of oxygen introduced into the decarbonization chamber 94 should be sufficient so that when the liquid 34 is returned to the first oxidation chamber 96, the return liquid 34 is substantially free of carbon. Flow from the decarbonization chamber 94 to the carbonization chamber 42, consisting of the combined flows through entrance means 76, contains sufficient excess carbon to ensure that the liquid 34 which returns to the carbonization chamber 42 to be substantially free of oxygen. This ensures that a substantial amount of CO is not released in either the carbonization or first oxidation chambers. The hot gas which passes out of the first oxidation chamber outlet pipe 98 is substantially nitrogen, and if steam is introduced, hydrogen. Thus, in the embodiment illustrated in the FIG. 2, the reactor 14 serves to provide at least somewhat purified gases, namely, carbon monoxide and nitrogen which gases can have significant value in industrial processes and which gases can have the energy therefrom extracted either in a single energy extractor 16 by combining the gases or separately in a plurality of energy extractors 16.

Referring again to FIG. 2, it is seen that oxidation chamber means 44 can be divided into not only the decarbonization chamber 94 and the first oxidation chamber 96, but also into a second oxidation chamber 108 into which steam is injected via conduits 109 and from which hydrogen is obtained in a fairly pure form from a second oxidation chamber outlet pipe 110. In the embodiment of the invention illustrated in FIG. 3 it is clear that if the second oxidation chamber 108 is provided and utilized the product gases individually comprise nitrogen, hydrogen and carbon monoxide. It is further clear that these gases can go to one or more of the energy extractors 16. The second oxidation chamber 108 is separated by the baffle means 40 above the liquid level 36 from the leaching chamber 74, the decarbonization chamber 94, the carbonization chamber 42, and the first oxidation chamber 96. Liquid flow communication of the liquid 34 is, however, allowed and in fact, is necessary for the overall refining of the carbon.

THIRD EMBODIMENT OF THE INVENTION

Turning now to FIG. 4, there is illustrated therein an alternate embodiment of the digestor 12, wherein said digestor 12 forms a part of the reactor 14 and wherein the mass 24 of the feed 18 is fed horizontally into the reactor 14 and more particularly, into the carbonization chamber 42 thereof and generally onto the surface 68 of the liquid 34. In this embodiment of the invention, the first end 28 of the mass 24 progresses generally horizontally along the surface 68 of the liquid 34. The feed adding means in the embodiment of FIG. 4 comprises force feeding means, for example, a conventional screw extruder 114 which rotates within a cylindrical tube 116 whereby the feed 18 is fed to the extruder 114 and then force fed against the second end 30 of the mass 24 as the extruder 114 rotates in the direction indicated in FIG. 4. A ram or other force feeding means can replace the extruder 114.

The takeoff means 32 in the embodiment of FIG. 4 comprise a plurality of openings 118 above the mass 24 leading off from the carburization chamber 42 with the openings 118 being spaced from one another along the length of the mass 24. What results then is a substantially horizontal distillation column for digestor 12. For example, the leftwardmost of the openings 118 would extract the most volatile materials in the mass 24, or produced by the decomposition, cracking and/or reforming thereof which occurs within the carbonization chamber 42. The rightwardmost of the openings 118 would take off only the least volatile of the fractions produced within the carbonization chamber 42. It is clear that high volatility fractions produced towards the left end (the second end 30) of the mass 24 can rise completely through the low temperature upper portions of the left end of the mass 24 without condensing therein and exit via the leftwardmost of the openings 118. The low volatility fractions produced toward the left end of the mass 24 will condense in the upper portions and not be released until they are carried within the mass 24 to the high temperature right end of the mass 24 in the carbonization chamber 42 where they exit via the rightwardmost of the openings 118.

As will be noted by reference to FIG. 4, the embodiment illustrated therein includes a leaching chamber 74 as in either of the embodiments shown in FIGS. 2 and 3. The embodiment of FIG. 4 further includes oxidation chamber means 44 which if desired, may take the configuration shown in FIG. 2. Hot fuel gas produced in the oxidation chamber means 44 exits therefrom via the outlet pipe 52 and can proceed to the energy extractor 16. Steam or iron ore can be fed via the conduits 109 to the second oxidation chamber 108. Circulation of the liquid 34 is accomplished by introducing some air via conduits 119 to the reactor 14 below the liquid level 36.

The embodiment of FIG. 4 has one very particular distinct advantage over the embodiment of FIG. 1 wherein a generally vertical digestor is utilized. This advantage results since much of the coal available in the United States is of a nature whereby it will swell and cake significantly on heating thereof. Thus, when one uses a vertical digestor 12 a possibility of a problem of clogging exists towards the bottom end 26 thereof generally restricting its use to low-swelling coals. In the embodiment of FIG. 4 the feed is horizontal and the mass 24 does not become heated at all until it has been inserted into the carbonization chamber 42 of the reactor 14 where it is an unconfined freely floating mass. Thus, expansion or caking of the feed 18 due to heating thereof cannot cause clogging.

FOURTH EMBODIMENT OF THE INVENTION

Another preferred embodiment of the present invention, which embodiment is useful with any of the previously described embodiments, is fully illustrated in FIG. 5. In the embodiment shown in FIG. 5, the oxidation chamber means 44 includes means for preventing outflow of the carbon monoxide produced therein unless the pressure thereof reaches a back pressure value. In the particular embodiment illustrated, the means comprises conventional flow regulator valve means 120 but in use such back pressure value may comprise turbine or process inlet pressure. The oxidation chamber means 44 is separated from the carbonization chamber 42 by baffle means 40 or the equivalent, which in this embodiment comprise simple pipes 122 or the like and the oxidation chamber means 44 is pressurized by a head of the liquid 34 which is equal to the predetermined value set in the flow regulator valve means 120 or the like. In this manner, the head of the liquid 34 is used to pressurize, for example, the carbon monoxide and nitrogen, produced in the oxidation chamber means 44. This permits injecting the fuel mass 24 and operating the carbonization and other chambers at atmospheric pressure without pressure locks, while generating pressurized hot fuel gas in the oxidation chamber for use in a gas turbine engine or the like. Thus, in the apparatus illustrated in FIG. 5, the liquid level comprises a first liquid level 124 in the carbonization chamber 42 and a second liquid level 126 in the oxidation chamber means 44. Further, the difference in height between the first liquid level 124 and the second liquid level 126 comprises the hydraulic pressure head of the liquid 34 which is generally equal to the predetermined back pressure value of the carbon monoxide, etc., within the oxidation chamber means 44 as set by the pressure regulator valve means 120 or the like.

It is clear that instead of or in addition to pressurizing the carbon monoxide, etc., formed in the oxidation chamber means 44, one can likewise or instead pressurize hot gases formed in other chambers in a similar manner.

FIFTH EMBODIMENT OF THE INVENTION

Adverting to FIG. 6, there is illustrated an alternate embodiment to FIG. 5 for obtaining a pressurized gas product. In the embodiment of FIG. 6 both the mass 24 and the oxygen containing gas introduced to the first oxidation chamber 96 are at atmospheric pressure. The carbonization chamber 94 is pressurized to produce carbon monoxide gas at the pressure of the head of the liquid 34 as set by the flow regulator valve means 120. The baffle means 40 is replaced in this embodiment by the equivalent pipes 128, 130, 132 and 134. Circulation by natural convection is indicated by arrows.

SIXTH EMBODIMENT OF THE INVENTION

FIG. 7 illustrates an embodiment of the present invention wherein a rotary stirrer 136 is within the mass 24 and serves to rotate the mass 24 thus setting up the necessary circulation within the reactor 14. As in the embodiment of FIG. 4 the digestor 12 is part of the reactor 14. Feed 18 enters the reactor 14 by gravity flow about the stirrer 136. The apparatus has the usual (to the invention) oxidation chamber means 44 and carbonization chamber means 42. In the particular embodiment illustrated in FIG. 7 a leaching chamber 74 is provided of the type of the leaching chamber 74 of FIG. 3.

SEVENTH EMBODIMENT OF THE INVENTION

FIG. 8 illustrates an apparatus in accordance with the present invention which utilizes physical separation of off gas. In this embodiment the first oxidation chamber 96 is narrow whereby residence time of the liquid 34 in the chamber is very short so that the carbon-oxygen reaction and resulting gas evolution does not go appreciably toward completion therein. This reaction then goes to completion in the decarbonization chamber 94 whereat carbon monoxide is evolved. This embodiment would preferably utilize a leaching chamber 74 of the type illustrated in FIG. 3.

PROCESS

While the processes by which the apparatus of the present invention operate should be generally apparent from the preceeding description of the apparatus and the interaction of the parts thereof, a brief summary of the processes, per se, may be useful in further understanding thereof.

In one sense the process comprises introducing the feed 18 into the carbonization chamber 42 of the reactor 14 and into contact, at a temperature above the carbonization temperature of the feed 18, with the liquid 34 which is a solvent for carbon and which fills the reactor 14 up to the liquid level 36 therein. There is also introduced into the oxidation chamber means 44 in the reactor 14 (the oxidation chamber means 44 being separated from the carbonization chamber 42 above liquid level 36 and flow of the liquid 34 being allowed between the oxidation chamber means 44 and the carbonization chamber 42) oxidizing means having an oxygen content and being overall exothermically reactive with the liquid 34 to elevate the temperature of the liquid 34 towards the aforementioned temperature above the carbonization temperature of the feed 18. The term "overall exothermically reactive" means that the overall reactions occurring in the entire process, including energy available from all products, can result in the net production of heat. The oxidizing means may be introduced at a velocity and in a direction which causes flow of the liquid 34 between the oxidation chamber means 44 and the carbonization chamber 42, mechanical stirring means may be utilized, some oxygen may be introduced below the liquid level or combinations of any of the above may be utilized to assure proper liquid flow. Finally, there is conducted away from the oxidation chamber means 44 a hot gas formed therein by reaction of the oxygen content of the oxidizing means. Most generally, this reaction will be between the oxidizing means and the liquid 34, generally iron, but, for example, in the embodiment shown in FIG. 1 wherein the oxidizing chamber means comprises a single chamber, this hot gas will also include therein carbon monoxide, some of which may be formed by direct reaction of air with carbon at the surface 68 of the liquid 34, along with nitrogen and possibly hydrogen if steam is part of the oxidizing gas means.

The use of multiple chambers with resulting separation of gases also falls within the scope of certain embodiments of the present invention. Steam and/or iron ore (oxide) may be introduced in some of said multiple chambers as an oxidizing agent. The impurity layer 66 and the valuable volatile components which form in the carbonization chamber 42 are generally removed separately therefrom.

In many of the embodiments shown, there is also formed within the reactor 14, a leaching chamber 74 and a metal oxide leach slag which reacts with the sulfur in the liquid 34 and retains it as a sulfide, which sulfur extracting and retaining leach slag is substantially insoluble in the liquid 34 and of a different (lower) density than the liquid 34, whereby the leach slag remains separated into a layer 82. Off gas formed within the leaching chamber will be conducted therefrom, which off gas will comprise carbon monoxide. Finally, the leach slag layer 82 formed in the leaching chamber 74 will be removed therefrom. As an added step, the removed leach slag may be reacted with carbon dioxide to produce elemental sulfur and recyclable metal oxide or hydroxide slag which may be recycled into the leaching chamber 74. Alternatively, the leach slag may be desulfurized continuously by reacting it in situ with steam and forming $H_2S$ which is removed with the off gas from the leaching chamber.

The above description of the preferred embodiments of the invention should not be considered as limiting the invention since a number of equivalent structures may be utilized in a like manner to accomplish a like result. Further, while the invention has generally been described with the preferred embodiment wherein the liquid 34 comprises iron, it should be noted that the liquid 34 can likewise comprises any of a number of other metals or alloys, or of molten salts, for example, molten calcium carbonate or mixtures of molten calcium carbonate with other molten salts. Yet further, while air has generally been used by way of example as the oxidizing gas means or at least a portion thereof, it should be realized that any oxygen containing gas can be so used. Further, any gas which will react with, for example, molten iron to produce dissolved iron oxide and at the same time produce heat may clearly be substituted for the air. Still further, iron oxide, e.g., iron ore may serve as a portion of the oxygen source whereby iron is a product of the process.

EXAMPLE

The purpose of this example was to bring together principle elements of the process to demonstrate its actual operation and basic conceptual feasibility.

The reactor vessel was a conventional 300 kW, 1400 pound capacity, Inductotherm induction furnace set up generally in accordance with the reactor 14 of FIG. 1. The 16 inch diameter by 22 inch deep crucible was covered by a 2 inch thick lid of Fiberfrax "Hot Board". A two and one-half inch wide by nine inch partition of high-alumina refractory brick (3000° F. service temperature) was cemented diametrically across the crucible immediately below the lid. The joints between the lid and the partition and between the lid and the crucible were made gas tight by interposed layers of Fiberfrax refractory felt. The crucible was charged with molten iron (mild steel) until surface level was about one and one-half inches above the bottom of the partition, and the temperature was maintained near 2850° F. by induction heating.

A high-volatile 182 " mesh bituminous coal was charged into the pyrolysis (carbonization) chamber 42 through the coal inlet port in the lid until coal flow stopped. The coal was maintained continuously at this level by adding coal to the inlet as coal was consumed in the pyrolysis (carbonization) chamber. When the first coal was injected, dense white smoke with a sulfurous odor evolved from the char gas outlet which condensed partially as tar around the edge of the outlet and burned with a sooty flame. Also, at first, the rate of dissolution of coal in the iron was relatively slow (only about five pounds in the first hour). This rate continuously increased with time, however (to about ten pounds per hour). It appeared that the low rate was due to a solid iron layer forming at the coal-iron interface due to the heat removed by the cracking of the coal. As the carbon content of the iron pool increased, and its melting point decreased, this problem was alleviated. This problem can be avoided by starting with high-carbon iron. After about one-half hour, the smoke and tar gradually disappeared from the char gas and it burned thereafter with a steady incandescent, smokeless and odorless flame resembling that of methane.

After about one hour of operation of the pyrolysis (carbonization) chamber, when the iron carbon content reached about ½ weight percent, air flow was initiated into the inlet of the oxidation chamber 44. For relatively slow air injection rates (less than 1 scf/min) an odorless off gas, which burned cleanly with a clear blue-white flame, was evolved from the high alumina off gas outlet stack. At high injection rates the evolved gas would not burn. Apparently, here also, the net endothermic reaction of the nonpreheated air with the carbon in the iron caused a solid iron crust to form beneath the jet, inhibiting the reaction. This limitation can also be avoided by starting with a high carbon content iron, as well as providing an adequate degree of air preheat.

After a total of about three hours operation, when the carbon content reached about 1 percent, oxygen flow at about 3 scf/min was initiated into the oxidation chamber inlet. The off gas flame was similar in character to the air-blown off gas flame (but much larger) and burned steadily. Because the net reaction was exothermic the electrical power to the induction furnace was turned off at this time. When the oxygen flow was increased to about five scf/min, the flame increased proportionately in size, but the off gas temperature exceeded the destruction temperature of the lid, terminating the test.

In summary, the following elements were operated together as a single series coupled system:

1. A multi-chamber molten-iron coal gasifier in a single reactor vessel. p1 2. Forced pyrolysis and dissolution of coal in molten iron in one of the chambers.
3. Gasification of the dissolved carbon in another chamber by injection of air or oxygen from above the surface of the molten iron pool.
4. Separation of the high btu char gas from the low btu off gas.
5. Isolation of the coal ash from the off gas by flotation as slag on molten iron in the pyrolysis chamber.
6. Horizontal feed of a pyrolyzing and dissolving coal layer by flotation of the layer on molten iron.
7. Isolation of other impurities (e.g., sulfur) from the off gas by their solution and retention in the molten iron solvent.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. Apparatus for converting a feed which includes a sulfur component and which yields carbon on being heated above a carbonization temperature thereof and which is solid at ambient temperature into a hot gas, comprising:
   a reactor;
   a liquid solvent for carbon which fills said reactor up to a liquid level therein below a top thereof;
   partition means, separating said reactor above said liquid level into a carbonization chamber and oxidation chamber means, said partition means terminating below said liquid level and above a bottom of said reactor to allow flow of liquid between said carbonization chamber and said oxidation chamber means, said partition means further defining a leaching chamber within said reactor separated above said liquid level from said carbonization chamber and said oxidation chamber means but allowing flow of liquid thereinto and thereoutof;
   means for introducing a feed which yields carbon on being heated above a carbonization temperature thereof and which is solid at ambient temperature into said carbonization chamber;
   means for introducing oxidizing means having an oxygen content into said oxidation chamber means to produce oxygen bound in said liquid solvent;
   means for causing flow of said liquid between said carbonization chamber and said oxidation chamber means;
   means for introducing a metal oxide, said metal forming a sulfide which is insoluble in said liquid and of a different density therefrom whereby said metal sulfide when formed separates into a sulfide layer, into said leaching chamber;
   means for conducting off gas formed by reaction of said metal oxide with sulfur and carbon dissolved in said liquid in said leaching chamber away therefrom;
   means for removing said sulfide layer from said leaching chamber; and
   means for conducting away from said oxidation chamber means a first hot gas formed therein.

2. Apparatus as in claim 1, wherein said liquid solvent comprises molten iron at a temperature within a range from about 1100° C. to about 1700° C.

3. Apparatus as in claim 2, further comprising:
   means for reacting said removed sulfide with carbon dioxide to produce elemental sulfur and recyclable metal oxide.

4. Apparatus as in claim 3, including:
   means for transferring said recyclable metal oxide to said metal oxide introducing means.

5. Apparatus for converting a feed which yields carbon on being heated above a carbonization temperature thereof and which is solid at ambient temperature into a hot gas, comprising:

a reactor;

a liquid solvent for carbon which fills said reactor up to a liquid level therein below a top thereof;

partition means, separating said reactor above said liquid level into a carbonization chamber and oxidation chamber means, said partition means terminating below said liquid level and above a bottom of said reactor to allow flow of liquid between said carbonization chamber and said oxidation chamber means;

means for introducing a feed which yields carbon on being heated above a carbonization temperature thereof and which is solid at ambient temperature into said carbonization chamber, said feed introducing means comprising means for contacting a first end of a mass of said feed extending generally linearly into said carbonization chamber with said liquid; and means for progressively adding said feed to a second end of said mass to maintain the extension thereof into said carbonization chamber substantially constant and create a temperature gradient therealong;

a plurality of volatile fraction takeoff means in flow communication with said mass along the length thereof for selectively removing fractions of differing volatilities therefrom;

means for introducing oxidizing means having an oxygen content into said oxidation chamber means to produce oxygen bound in said liquid solvent;

means for causing flow of said liquid between said carbonization chamber and said oxidation chamber means; and means for conducting away from said oxidation chamber means a first hot gas formed therein.

6. Apparatus as in claim 5, wherein said first end feed contacting means comprises a generally vertical digester through which said feed progresses downwardly under the influence of gravity and said first end of said feed comprises a bottom end thereof, said feed adding means comprises means for adding feed to a top portion of said digester and said fraction takeoff means comprises a plurality of vertically separated openings through an external wall of said digester.

7. Apparatus as in claim 6, wherein said liquid solvent comprises molten iron at a temperature which falls within a range from about 1100° C. to about 1700° C.

8. Apparatus as in claim 7, including:
means for removing a slag layer formed in said carbonization chamber.

9. Apparatus as in claim 8, wherein said feed includes a sulfur component, said partition means further defines a leaching chamber within said reactor separated above said liquid level from said carbonization chamber and said oxidation chamber means but allowing flow of liquid thereinto and thereoutof and further comprising:

means for introducing a metal oxide, said metal forming a sulfide which is insoluble in said liquid and of a different density therefrom whereby said metal sulfide when formed separates into a sulfide layer, into said leaching chamber;

means for conducting off gas formed by reaction of said metal oxide with sulfide and carbon dissolved in said liquid in said leaching chamber away therefrom; and means for removing said sulfide layer from said leaching chamber.

10. Apparatus as in claim 9, further comprising:

means for reacting said removed sulfide with carbon dioxide to produce elemental sulfur and recyclable metal oxide or hydroxide.

11. Apparatus as in claim 10, including:
means for transferring said recyclable metal oxide or hydroxide to said metal oxide or hydroxide introducing means.

12. Apparatus as in claim 11, wherein said oxidation chamber means comprises a decarbonization chamber and a first oxidizing chamber within said reactor defined by said partition means, said decarbonization chamber is separated above said liquid level from said carbonization and said first oxidation chambers but said partition means allows flow of liquid into said decarbonization chamber with carbon dissolved therein from said carbonization chamber and of liquid with oxygen bound therein from said first oxidation chamber and flow of liquid from said decarbonization chamber substantially free of oxygen bound therein to said decarbonization chamber and of liquid therefrom having oxygen bound therein to said first oxidation chamber and further comprising:

means for conducting a second hot gas away from said decarbonization chamber.

13. Apparatus as in claim 12, wherein said oxidation chamber means further comprises a second oxidation chamber separated above said liquid level from said decarbonization and first oxidation chambers but in liquid flow communication therewith, said oxidizing means comprises a first oxidizing gas comprising air introduced into said first oxidation chamber and a second oxidizing gas comprising steam introduced into said second oxidization chamber, said first hot gas comprises a first separate portion comprising nitrogen produced in said first oxidation chamber and a second separate portion comprising hydrogen produced in said second oxidation chamber, and said second hot gas comprises carbon monoxide.

14. Apparatus as in claim 5, wherein said first end feed contacting means comprises means for feeding said mass generally horizontally into said carbonization chamber generally onto a surface of said liquid and said first end of said mass progresses generally horizontally along said surface, said feed adding means comprises means for force feeding said feed against said second end of said mass and said fraction takeoff means comprise a plurality of openings above said mass and spaced from one another along the length thereof.

15. Apparatus as in claim 14, including:
means for removing a slag layer formed in said carbonization chamber.

16. Apparatus as in claim 15, wherein said feed includes a sulfur component, said partition means further defines a leaching chamber within said reactor separated above said liquid level from said carbonization chamber and said oxidation chamber means but allowing flow of liquid thereinto and thereoutof and further comprising:

means for introducing a metal oxide, said metal forming a sulfide which is insoluble in said liquid and of a different density therefrom whereby said metal sulfide when formed separates into a sulfide layer, into said leaching chamber;

means for conducting off gas formed by reaction of said metal oxide with sulfur and carbon dissolved in said liquid in said leaching chamber away therefrom; and means for removing said sulfide layer from said leaching chamber.

17. Apparatus as in claim 16, further comprising:
means for reacting said removed sulfide with carbon dioxide to produce elemental sulfur and recyclable metal oxide.

18. Apparatus as in claim 17, including:
means for transferring said recyclable metal oxide to said metal oxide introducing means.

19. Apparatus as in claim 18, wherein said oxidation chamber means comprises a decarbonization chamber and a first oxidizing chamber within said reactor defined by said partition means, said decarbonization chamber is separated above said liquid level from said carbonization chamber and said first oxidation chambers but said partition means allows flow of liquid into said decarbonization chamber with carbon dissolved therein from said carbonization chamber and of liquid with oxygen bound therein from said first oxidation chamber and flow of liquid from said decarbonization chamber substantially free of oxygen bound therein to said carbonization chamber and further comprising:
means for conducting a second hot gas away from said decarbonization chamber.

20. Apparatus for converting a feed which yields carbon on being heated above a carbonization temperature thereof and which is solid at ambient temperature into a hot gas, comprising:
a reactor;
a liquid solvent for carbon which fills said reactor up to a liquid level therein below a top thereof;
partition means, separating said reactor above said liquid level into a carbonization chamber and oxidation chamber means, said partition means terminating below said liquid level and above a bottom of said reactor to allow a flow of liquid between said carbonization chamber and said oxidation chamber means;
means for introducing a feed which yields carbon on being heated above a carbonization temperature thereof and which is solid at ambient temperature into said carbonization chamber;
means for introducing oxidizing means having an oxygen content into said oxidation chamber means to produce oxygen bound in said liquid solvent;
means for causing flow of said liquid between said carbonization chamber and said oxidation chamber means;
means for conducting away from said oxidation chamber means a first hot gas formed therein; and
back pressure creating means in said hot gas conducting means to prevent flow of said hot gas therethrough unless the pressure thereof reaches a required value; and wherein said liquid level comprises a first liquid level in said carbonization chamber and a second liquid level in said oxidation chamber means and the difference in height between said first and second liquid levels comprises a hydraulic pressure head of said liquid generally equal to said required hot gas pressure value.

21. Apparatus as in claim 20, including means for abstracting energy in usable form from said hot gas after it has been compressed to said predetermined pressure value.

22. Apparatus as in claim 21, wherein said liquid solvent comprises molten iron at a temperature which falls within a range from about 1100° C. to about 1700° C.

23. Apparatus as in claim 22, wherein said energy abstracting means comprises gas turbine means.

24. Apparatus for converting a feed which yields carbon on being heated above a carbonization temperature thereof and which is solid at ambient temperature into a hot gas, comprising:
a reactor;
a liquid solvent for carbon which fills said reactor up to a liquid level therein below a top thereof;
partition means, separating said reactor above said liquid level into a carbonization chamber and oxidation chamber means, said partition means terminating below said liquid level and above a bottom of said reactor to allow flow of liquid between said carbonization chamber and said oxidation chamber means;
means for introducing a feed which yields carbon on being heated above a carbonization temperature thereof and which is solid at ambient temperature into said carbonization chamber, said feed introducing means comprising means for contacting a generally circular mass of said feed extending into said carbonization chamber with said liquid; and means for progressively adding said feed to a central portion of said mass to maintain the extention thereof into said carbonization chamber substantially constant and create a temperature gradient from said central portion to a peripheral portion of said mass;
means for causing flow of said liquid between said carbonization chamber and said oxidation chamber means;
a plurality of volatile fraction takeoff means in flow communication with said carbonization chamber extending radially along said mass for selectively removing fractions of differing volatilities therefrom; and
means for conducting away from said oxidation chamber means a first hot gas formed therein.

25. Apparatus as in claim 24, including:
stirrer means engaged in said central portion of said mass for rotating said mass and thereby improving dissolution of said mass and creating fluid flow within said liquid.

26. Apparatus as in claim 25, including means for abstracting energy in useable form from said hot gas.

27. Apparatus as in claim 26, wherein said liquid solvent comprises molten iron at a temperature which falls within a range from about 1100° C. to about 1700° C.

28. Apparatus as in claim 27, wherein said energy abstracting means comprises gas turbine means.

29. Apparatus as in claim 28, wherein said gas turbine means includes a plurality of combustion stages which sequentially combust portions of said second gas to maintain the temperature of said second gas within a temperature range corresponding generally to maximum efficiency of said gas turbine means.

* * * * *